United States Patent
Hirth

(10) Patent No.: US 10,320,678 B2
(45) Date of Patent: Jun. 11, 2019

(54) MAPPING CONTROL PROTOCOL TIME ONTO A PHYSICAL LAYER

(71) Applicant: Broadcom Corporation, Irvine, CA (US)

(72) Inventor: Ryan Edgar Hirth, Windsor, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 447 days.

(21) Appl. No.: 14/657,458

(22) Filed: Mar. 13, 2015

(65) Prior Publication Data
US 2015/0271074 A1    Sep. 24, 2015

Related U.S. Application Data

(60) Provisional application No. 61/968,701, filed on Mar. 21, 2014.

(51) Int. Cl.
*H04L 12/801* (2013.01)
*H04J 14/02* (2006.01)
*H04L 12/825* (2013.01)

(52) U.S. Cl.
CPC .......... *H04L 47/12* (2013.01); *H04J 14/0227* (2013.01); *H04L 47/25* (2013.01)

(58) Field of Classification Search
None
See application file for complete search history.

(56) References Cited

U.S. PATENT DOCUMENTS

| | | | | |
|---|---|---|---|---|
| 5,355,124 A * | 10/1994 | Kochem | ............... | H04L 12/42 370/434 |
| 6,466,592 B1 * | 10/2002 | Chapman | ............. | H04N 21/235 370/537 |
| 6,636,529 B1 * | 10/2003 | Goodman | ............. | H04J 3/1617 370/466 |
| 7,027,547 B1 * | 4/2006 | Hwang | ................... | H04L 25/05 375/372 |
| 2004/0184474 A1 * | 9/2004 | Kim | ................... | H04Q 11/0067 370/445 |
| 2004/0202205 A1 * | 10/2004 | Sheth | ...................... | H04J 3/04 370/539 |
| 2005/0030898 A1 * | 2/2005 | Furlong | ................. | H04L 12/24 370/236 |

(Continued)

OTHER PUBLICATIONS

IEEE Standard 802.3, Clause 48.2.4.2.3, pp. 336-337, Dec. 28, 2012.

(Continued)

*Primary Examiner* — Christopher T Wyllie
(74) *Attorney, Agent, or Firm* — Morgan, Lewis & Bockius LLP

(57) ABSTRACT

An IDLE insertion technique maps MPCP time onto an EPoC PHY. The techniques address the variability of bandwidth due to bit loading over time. The techniques allow MPCP time to follow wall time at the MAC layer while tracking bytes at the PMD layer. The techniques also facilitate use of the EPON MAC with few changes in an EPoC environment. The bandwidth allocation messages may follow the same format as in EPON, and the techniques may implement IDLE insertion that accounts for EPoC PHY FEC overhead and datarate differences compared to the MAC.

20 Claims, 11 Drawing Sheets

(56) References Cited

U.S. PATENT DOCUMENTS

| | | | | |
|---|---|---|---|---|
| 2005/0190732 A1* | 9/2005 | Douglas | H04L 41/06 | 370/338 |
| 2006/0013394 A1* | 1/2006 | O'Brien | H04L 1/0057 | 380/255 |
| 2006/0050884 A1* | 3/2006 | O'Brien | H04L 1/0057 | 380/255 |
| 2008/0049788 A1* | 2/2008 | McClellan | H04L 27/0008 | 370/468 |
| 2009/0154455 A1* | 6/2009 | Diab | H04L 47/10 | 370/389 |
| 2009/0154473 A1* | 6/2009 | Diab | H04L 12/4013 | 370/400 |
| 2009/0154593 A1* | 6/2009 | Diab | H04L 47/10 | 375/295 |
| 2010/0111100 A1* | 5/2010 | Baumer | G09G 3/2096 | 370/465 |
| 2010/0151898 A1* | 6/2010 | Lee | H04B 1/18 | 455/522 |
| 2010/0312909 A1* | 12/2010 | Diab | G06F 1/3209 | 709/238 |
| 2011/0119568 A1* | 5/2011 | Jeong | H03M 13/1185 | 714/790 |
| 2011/0320905 A1* | 12/2011 | Lin | H04L 1/0067 | 714/752 |
| 2012/0320771 A1* | 12/2012 | Chini | H04L 12/12 | 370/252 |
| 2013/0010632 A1* | 1/2013 | Wang | H04B 17/309 | 370/252 |
| 2013/0279354 A1* | 10/2013 | Ekman | H04W 24/00 | 370/252 |
| 2014/0010539 A1* | 1/2014 | Varanese | H04J 3/1694 | 398/66 |
| 2014/0199069 A1* | 7/2014 | Garavaglia | H04Q 11/0067 | 398/66 |
| 2015/0016466 A1* | 1/2015 | Lin | H04L 47/38 | 370/412 |
| 2015/0121120 A1* | 4/2015 | Lin | G06F 5/06 | 713/601 |

OTHER PUBLICATIONS

IEEE Standard 802.3, Clause 76.3.2, pp. 612-617, Dec. 28, 2012.
IEEE Standard 802.3, Clause 76.3.3.3, pp. 636-638, Dec. 28, 2012.
IEEE Standard 802.3, Clause 76.3.3.7.1, pp. 643-646, Dec. 28, 2012.
IEEE Standard 802.3, Clauses 76.5.4.6 and 76.5.4.9, pp. 650-651, Dec. 28, 2012.
Dawe, Piers, et al., Proposal for FEC in 40G/100G Ethernet, May 2008, 25 pages, Avago Technologies, Munich, Germany.
Szczepanek, Andre, et al., 10GBase-KR FEC Tutorial, Jul. 2006, 87 pages, IEEE 802 Plenary, Washington, DC.

* cited by examiner

US 10,320,678 B2

MAPPING CONTROL PROTOCOL TIME ONTO A PHYSICAL LAYER

PRIORITY CLAIM

This application claims priority to provisional application Ser. No. 61/968,701, filed Mar. 21, 2014, which is entirely incorporated by reference.

TECHNICAL FIELD

This disclosure relates to networking. This disclosure also relates to adapting to datarate variability in EPON Protocol Over Coax (EPoC) network links that interface with Ethernet Passive Optical Networks (EPON).

BACKGROUND

High speed networks form part of the backbone of what has become indispensable worldwide data connectivity. The networks include wireless, optical, and coax connections between devices. For instance, a cable television operator may deliver content over an optical network that extends from the operator headend out to a neighborhood hubsite, and then over coax from the hubsite to many individual homes. Improvements in these networks will further enhance their performance and capabilities.

DETAILED DESCRIPTION

Introduction

Figure 1:
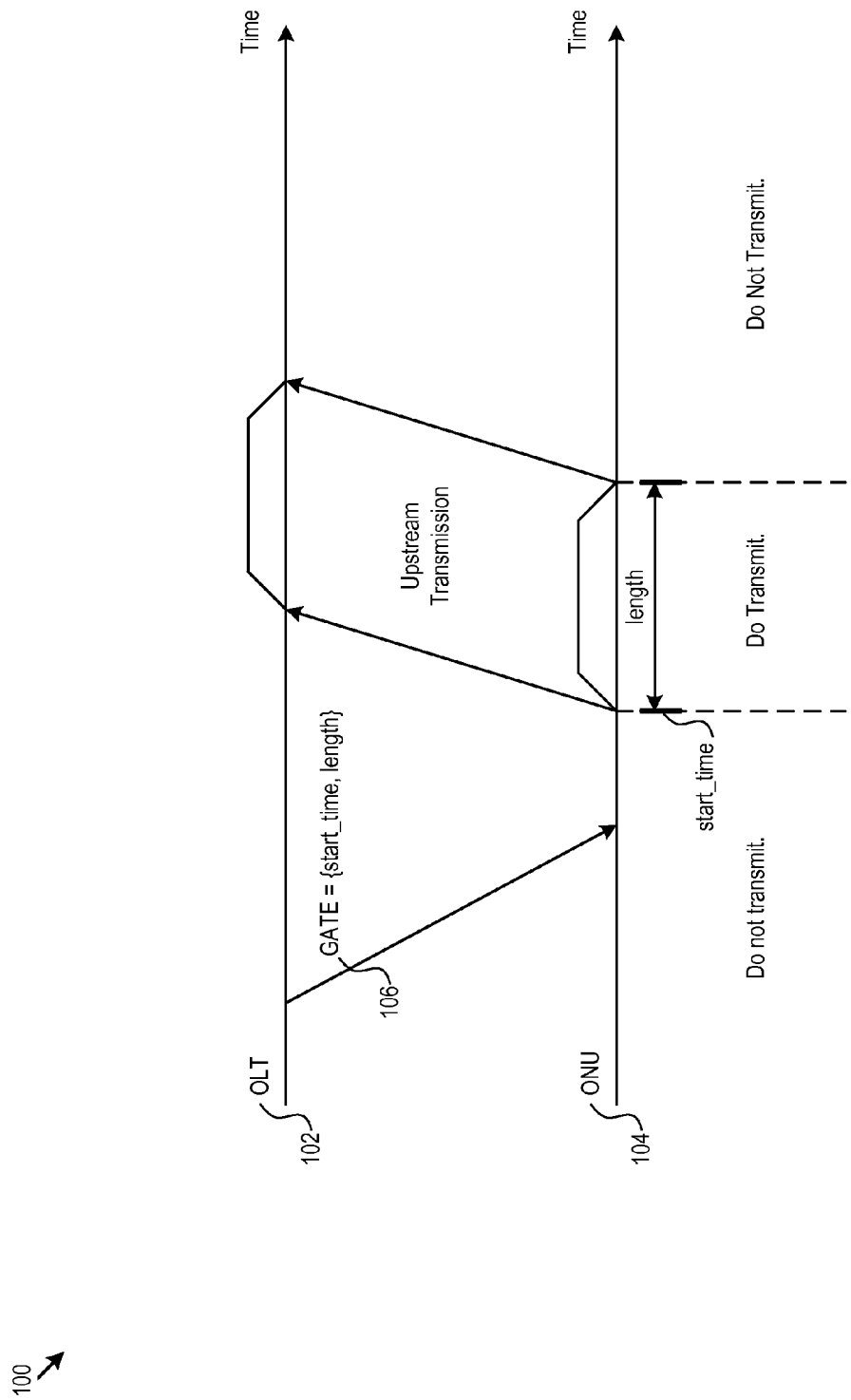
FIG. 1 shows an example of a GATE message and upstream transmission.

As an introduction, the IDLE insertion and deletion techniques that are described in detail below may be implemented in networks that employ a Multi-Point Control Protocol (MPCP) and Media Access Control (MAC) control messages, e.g., the 64 byte GATE and REPORT control messages. The MPCP may be the MPCP defined by IEEE 802.3ah, with additional functionality described below. The MPCP may operate in connection with a Passive Optical Network (PON), including Ethernet PON (EPON). Further, the networks may include EPON Protocol over Coax (EPoC) communication links, and the networks may include Optical Line Terminals (OLTs) and Optical Network Units (ONUs) that support both upstream and downstream communication.

In one aspect, the techniques facilitate mapping MPCP time in terms of GATE and REPORT messages onto an EPoC Physical layer (PHY). The techniques help address the variability of bandwidth due to bit loading over time. MPCP time may follow wall clock time at the Media Access Control (MAC) layer while tracking bytes at the Physical Medium Dependent (PMD) layer.

The techniques facilitate the use of the EPON MAC with little or no change to the EPoC environment. As just one example, the GATE and REPORT messages may follow the same format as with EPON. The techniques may involve an IDLE insertion process that is updated to account for the EPoC PHY overhead and datarates and changes to the overhead (e.g., grant overhead (OH)) and datarates. The techniques may also dynamically change the rate parameter, e.g., by aligning the update to the start of an Orthogonal Frequency Division Multiple Access (OFDMA) frame.

In some implementations, the techniques have the PHY insert IDLEs between bursts based on the rate. In this way, the MPCP time may be maintained. Multiple ONUs may track, e.g., a common OFDMA profile, so the MPCP time deviates approximately equally across the network. In addition, the techniques may employ fractional MPCP timing, e.g., to increase the precision of timing alignment. At 10 Gigabit (10G) rates, a Time Quanta (TQ) is 20 bytes. At the EPoC rate (which may be less than 10 Gbps), the TQ may be less. When expanding the MPCP time from the PHY to the MAC some ambiguity may occur. The techniques may reduce the ambiguity using fractional TQ and tracking over multiple mappings. Doing so may help to attenuate any jitter introduced in the MPCP timestamp.

The techniques facilitate the MAC being agnostic or unaffected by the PHY's position in two dimensional OFDMA space. The techniques may include the OLT inversely calculating the IDLE insertion function to determine an exact grant length. Further, the grant length in the GATE message may be expressed without Forward Error Correcting (FEC) or rate overhead.

With regard to mapping bits to TQ, the TQ may be, for instance 16 ns, and the bits per TQ may vary based on the FEC and rate. Consider, for instance, a 10 G EPON MAC operating at 10 Gbps. Regarding the REPORT frames, the report queue lengths are at 20 Bytes per TQ. Regarding GATE frames, the techniques may allow transmission for Grant Length * TQ, and the number of Bytes transmitted may be based on the IDLE insertion rate.

As discussed in more detail below, the Ethernet MAC may use IDLE insertion to adapt data rates. For instance, IEEE 802.3 adjusts for MAC to Physical Coding Sublayer (PCS) rate differences by increasing the interpacket gap. EPON may use IDLE insertion to account for optical FEC overhead to, e.g., maintain MPCP timestamp alignment. EPoC may also use this method to account for FEC overhead and data rate. The EPoC PCS removes the IDLEs to meet the PMD data rate.

Transmit Allocations

FIG. 1 shows an example 100 of a controller providing a transmit allocation to a network node. The transmit allocation, starting at 'start time' and extending for 'length' is conveyed, e.g., from the OLT 102 to the ONU 104 by the GATE message 106. The ONU stays within the granted allocation boundaries to avoid transmission collision with other ONUs. The OLT does not necessarily know the ONU's data rate, overhead, or other transmission characteristics, and the ONU may decide how efficient (or inefficient) it will be within its granted allocation.

Figure 2:
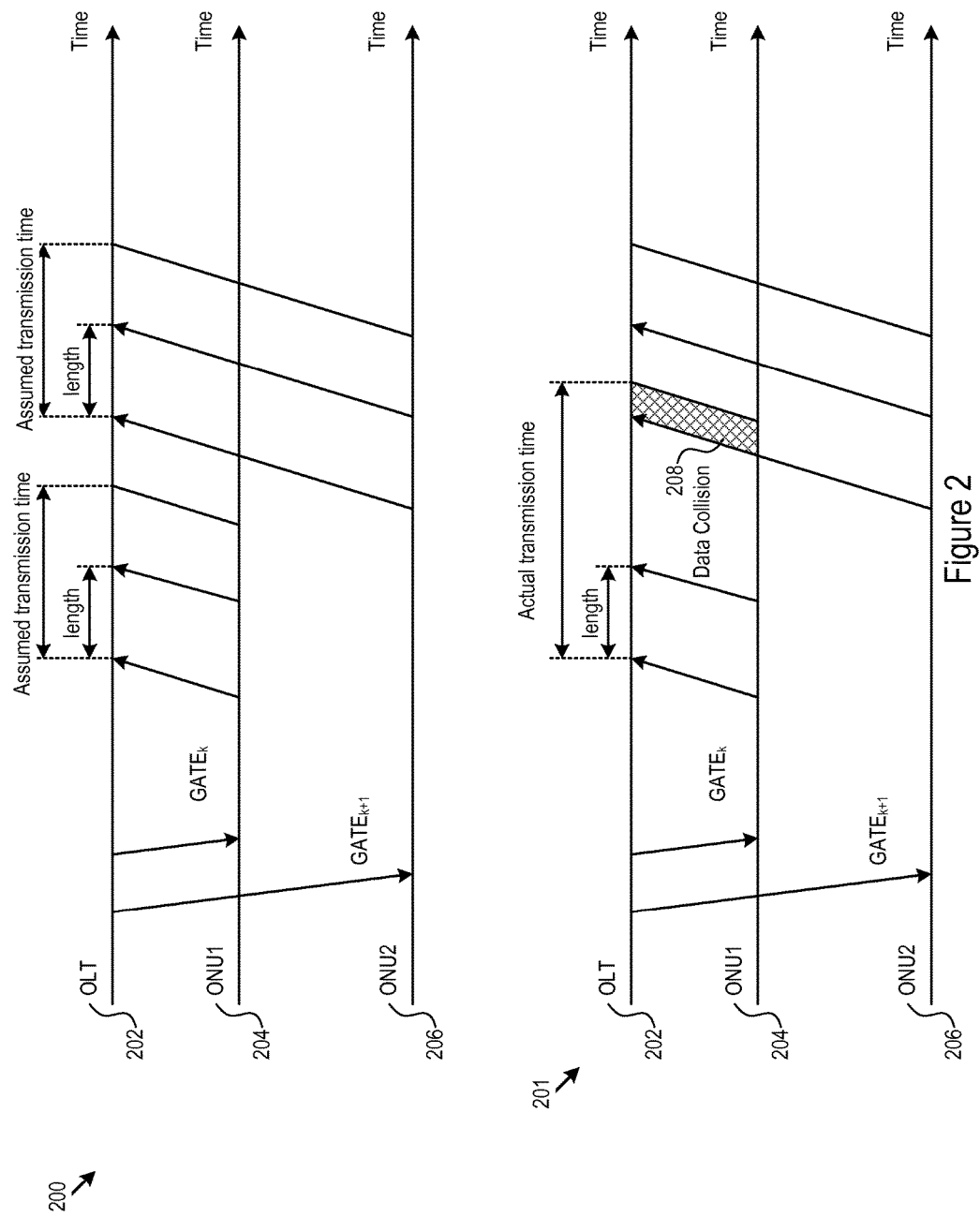
FIG. 2 shows additional examples of GATE messages and upstream transmissions.

FIG. 2 shows examples 200 and 201 of transmit allocations in an environment where an OLT 202 communicates with multiple ONUs, e.g., the first ONU 204 and the second ONU 206. If the actual transmission time by the first ONU 204 overlaps the transmission time for the second ONU 206, then there may be data collision 208. Note that the 'length' parameter specified in the transmit allocation, e.g., by the GATE message, may represent the net amount of data to be transmitted, and that the OLT 202 would then preferably have knowledge of the ONU data rate, including factors such as transmission overhead. If the data rate or other factors, such as overhead, can change, or if the OLT 202 knowledge loses synchronism with the ONU state affecting data transmission, then the actual transmission time may vary, and may cause the data collision 208. That is, the grant 'length' parameter preferably represents the MPCP time duration of the grant.

Regarding grant lengths, the Coax Line Terminal (CLT) bridges the optical (e.g., time) domain and the coax domain (e.g., time, sub-carrier). The CLT may be responsible for adding in FEC overhead using, e.g., the same method as the 10 G EPON standard. Grant lengths are not required to equal reported queue length, and the CLT may modify the grant length to adjust for FEC, rate, and overhead. A Dynamic Bandwidth Allocation (DBA) algorithm translates the Report Length to Grant Length. For instance, a DBA may use the ONU IDLE insertion function to convert the queue length to an equivalent grant length. The queue length represents the length of data reported by the ONU that the ONU has ready to transmit. The DBA may convert from the queue length to the grant length by accounting for the rate difference between the PHY layer and the MAC layer, and also accounting for FEC parity and other overhead. This conversion via IDLE insertion is described in more detail below. The accuracy of the conversion results in less unused bandwidth on the PHY.

The MAC in the Coax Network Unit (CNU) performs transmission for the period of time in the Grant Length. The MAC may insert IDLEs on one or more frames. The IDLE insertion function may account for an EPoC FEC overhead and Rate differences between the MAC and the PHY.

Regarding grant start time, the CLT may assign the Grant Start Time to any MPCP value. The CNU data detector may then align transmit enable to Resource Blocks (RBs). For instance, the first RB may be filled with IDLEs until the first packet, and the last RB may be filled with IDLEs after the end of the last packet. The number of RBs used for a given grant length may vary based on the bit loading. Grant Start Times need not be aligned to RBs, as the MAC and MAC Control layers are not necessarily aware of Physical Medium Attachment (PMA) alignment.

Regarding MPCP jitter, in EPON, downstream jitter may be 8 TQ and upstream jitter may be 12 TQ. The start of the MAC DA may be used as the timing reference point. The MPCP may be generated at the MAC Control, e.g., above FEC. The PMA may de-jitter overhead due to FEC Parity. Also, the MPCP may track byte times across the PMA. The MPCP time may vary across different bit loadings, and therefore not track 'wall' time. Each byte within a RB may map to an MPCP time, e.g., from MAC post Idle deletion. The PMA may insert Idles to realign MPCP to 'wall' time at the receiver. Note that the mean bit rate can be used in the IDLE Insertion function to reduce calculation complexity.

Note that EPoC may follow the same MPCP method as 10 G EPON, according to IEEE 802.3av. However, with the IDLE insertion techniques described in more detail below, the GATE messages may set the length of the grant with a grant length of, e.g., 16 ns/TQ, the Grant Length may include grant overhead, and REPORT messages may use, e.g., 20B/TQ for queue lengths and need not include overhead. The IDLE insertion techniques may modify the IDLE insertion formula to include the EPoC PMA overhead.

Example Network Architecture

Figure 3:
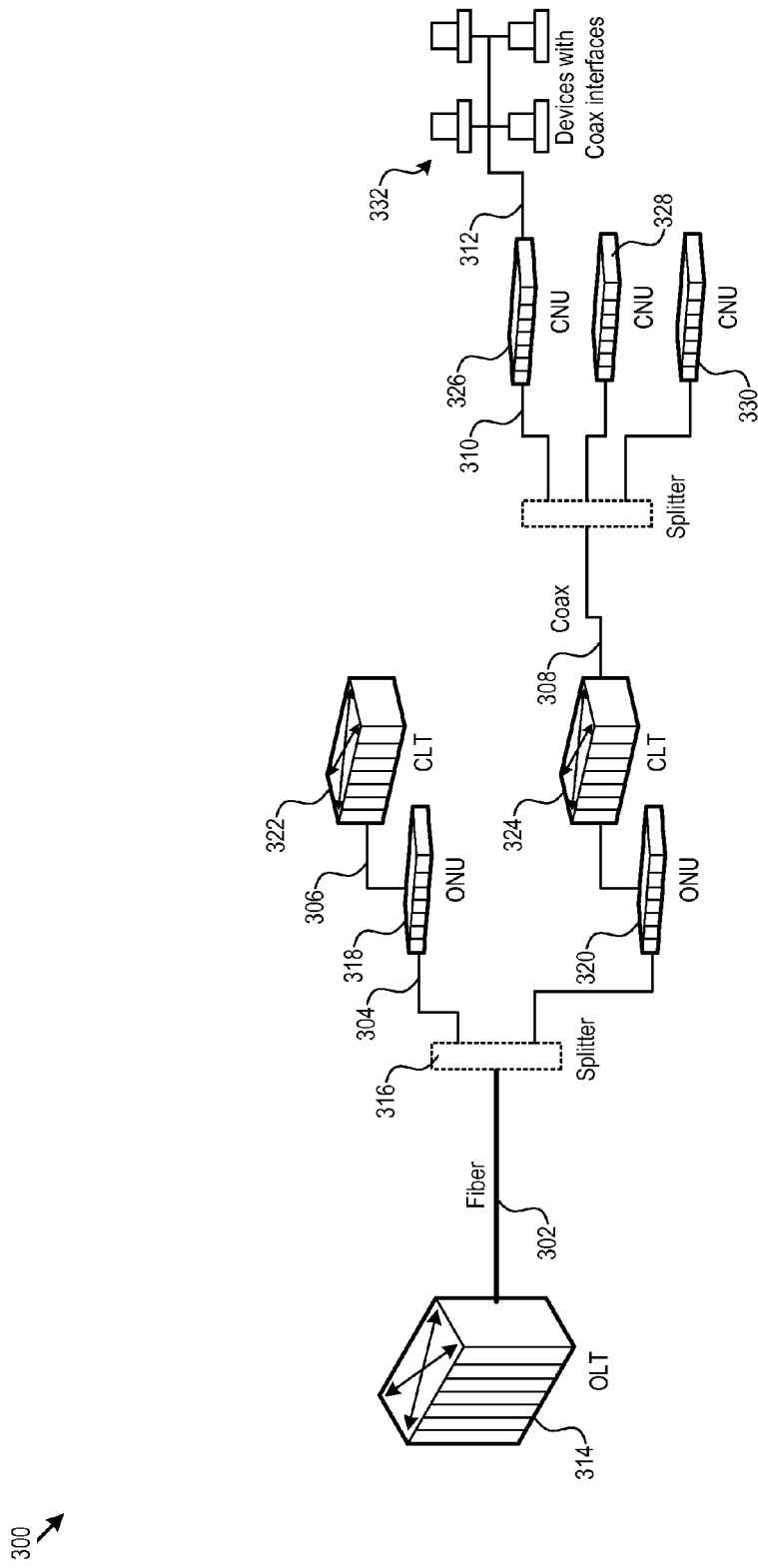
FIG. 3 shows a network that includes optical and coaxial (coax) pathways.

FIG. 3 shows an example network architecture 300 that includes optical and coaxial (coax) pathways. The architecture 300 may establish an environment in which there is transparent extension of EPON services over coaxial cable. More specifically, the network distributes content over fiber connections, e.g., the fiber connections 302, 304, and 306 and coax connections, e.g., the coax connections 308, 310, and 312. FIG. 3 shows that an OLT 314 provides content over the fiber 302, which the splitter 316 distributes to multiple different downstream entities, such as the ONUs 318 and 320.

As noted above, CLTs, e.g., the CLTs 322 and 324 convert the optical domain into the coax domain. The architecture may thereby implement EPON protocol over a coaxial distribution network, e.g., as described in IEEE 802.3bn, with extensions for IDLE insertion and rate adaptation as noted below. Specific network elements may implement the IDLE insertion techniques, for instance to adapt a fixed MAC datarate (e.g., 10 Gbps applicable to optical networks) to a subrated PHY (e.g., less than 10 Gbps applicable to coaxial cable communications). Accordingly, the content originally sent over fiber may travel over the coax pathways to downstream entities that use coax interfaces. In FIG. 3, examples of those entities include the CNUs 326, 328, and 330, and the user devices 332. These entities may include individual residences, businesses, cellular backhaul links, high rise home or business buildings, and other entities.

IDLE Insertion

The Ethernet MAC works at a fixed native rate, e.g., 10 Gbps. Accordingly, there is a technical challenge involved with adapting the fixed rate MAC to a PHY that has a different or variable rate, e.g., between 0 and 10 Gbps. This may be the case, for instance, where optical networks links transition to coax distribution links. The rate on the coax links may adapt based on line quality and negotiated rates, as examples. One benefit of the IDLE insertion technique is that it facilitates adapting the fixed MAC rate to the variable PHY rate. Note that the rate may be limited by other factors, such as FEC, probe frames, and OFDM overhead (such as burst markers), and other line overhead. The rate may be a global parameter and known to the MAC.

Figure 4:
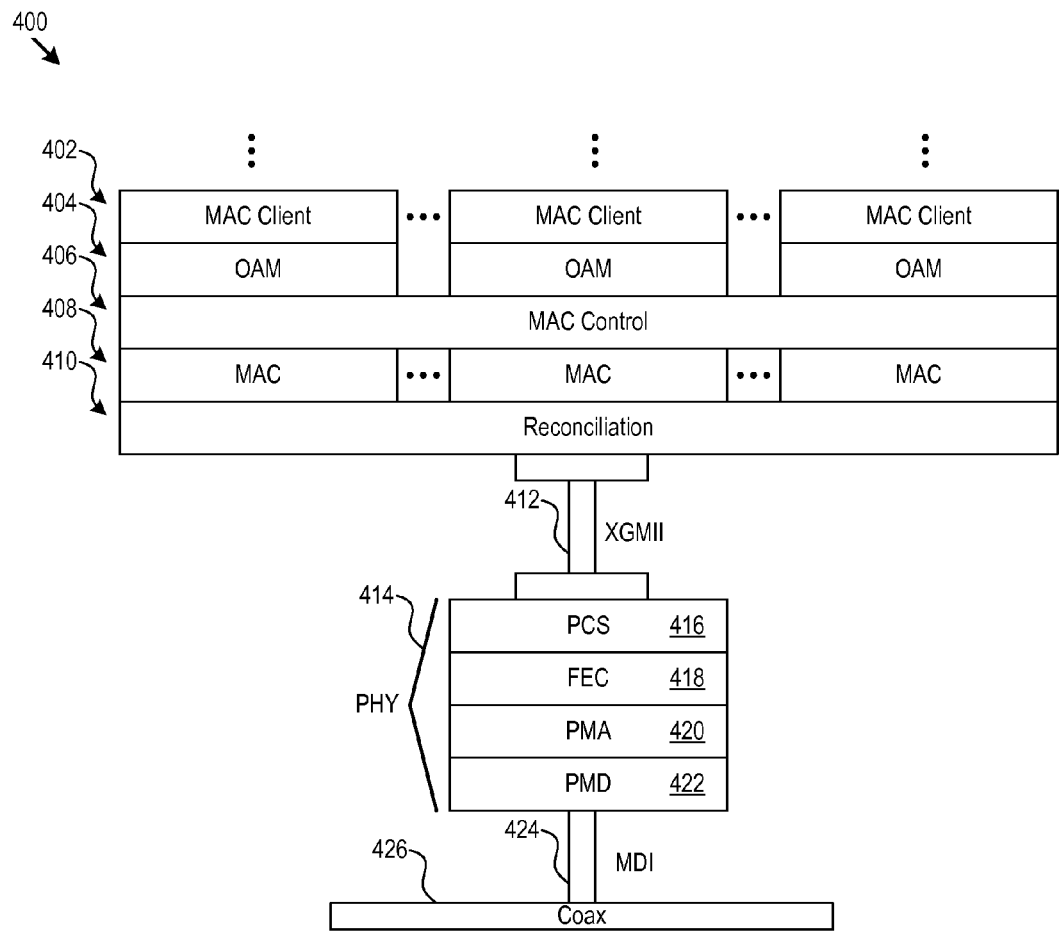
FIG. 4 shows an example of a network protocol stack.

FIG. 4 shows part of a network layer diagram 400. The network layer diagram 400 includes MAC clients 402, Operations, Administration, and Maintenance (OAM) 404, and MAC control 406. The network layer diagram also shows the MAC 408 itself, and a reconciliation layer 410 prior to the Gigabit Media Independent Interface (XGMII) 412.

The XGMII 412 transports data to the PHY layer 414. In the example in FIG. 4, the PHY 414 includes a PCS layer 416 and a PMA layer 420. The PHY 414 also includes a PMA layer 420 and PMD layer 422. The Medium Dependent Interface (MDI) 424 provides the connection to the physical medium, in this case the coaxial cable 426.

Above the MAC layer 408 is the MAC control layer 406, where MPCP is implemented. The MPCP, for instance, time stamps outgoing packets and provides a request and grant protocol (e.g., as described above with regard to FIGS. 1 and 2) based on the time stamps. That is, MPCP time facilitates scheduling multiple upstream clients so that they do not overlap in transmission time. Accordingly, one goal is to hold MPCP time to a certain resolution to prevent upstream bursts from overlapping or contending with each other. Said another way, minimizing jitter in the time stamps facilitates collision free accesses to the physical medium.

Figure 5:
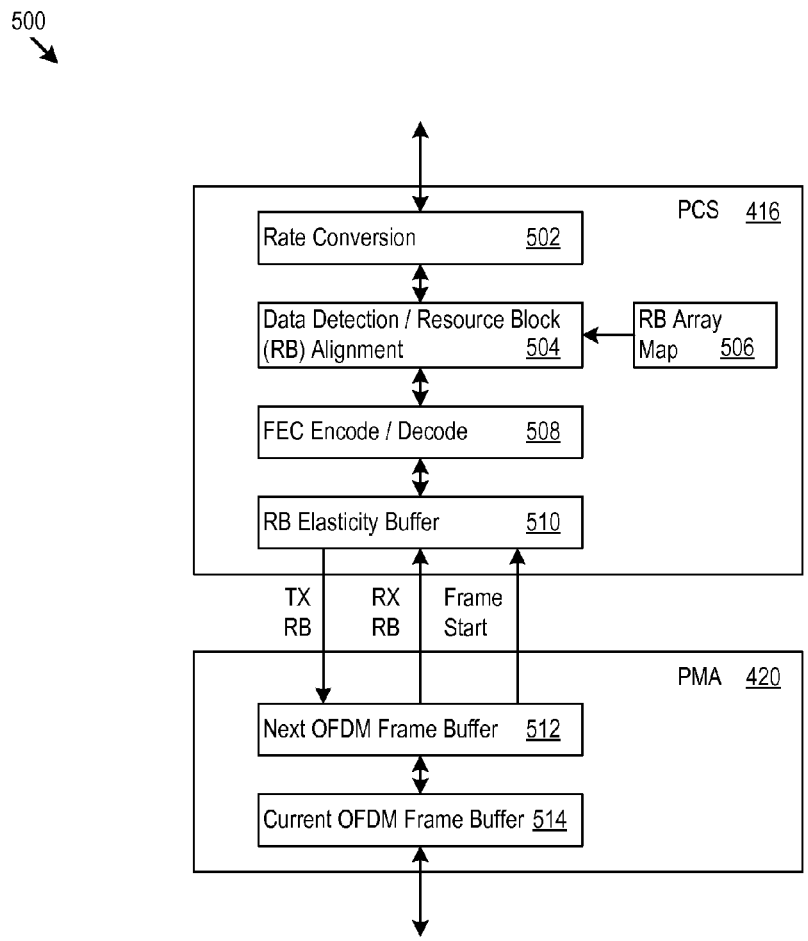
FIG. 5 shows an example implementation of IDLE insertion at the PHY layer.

FIG. 5 shows an example implementation 500 of IDLE insertion at the PHY layer. The implementation includes rate conversion logic 502, which may, for instance, calculate and determine rate conversion parameters. The rate conversion logic 502 may remove IDLEs from received packets in a manner that maintains packet timing (e.g., as the inverse operation for outgoing packets, as described further below), adjust for average bit rate, as well as convert to the PHY clock domain, among other functions. The data detection logic 504 receives Resource Block (RB) data from the RB array map 506. The RB array map 506 may, for instance, indicate which RBs are available for the system to use, and their frequency and symbol configuration. The data detection logic 504 aligns data to RBs and maintains MPCP timing. In that regard, the data detection logic 504 may insert IDLE characters, e.g., at the end of a packet and align to FEC codeword block size. The data detection logic 504 may also insert start and end markers into the packet.

The implementation 500 also includes FEC logic 508 for FEC encoding of outgoing packets and FEC decoding of received packets. For outgoing packets, the FEC logic 508 may replace IDLE characters originally inserted as placeholders for FEC, with the FEC parity data. For received packets, the FEC logic 508 may perform error detection and correction based on the received FEC parity data, remove the FEC parity data, and insert IDLE characters (e.g., as the inversion operations applied to outgoing frames). An RB elasticity buffer 510 may be included to align RBs to the OFDM frame, and also to help absorb variation in bit rates. The RB elasticity buffer 510 may thereby support the transmission of probe frames and the execution of PHY discovery processes without distorting packet timing. FIG. 5 also shows a current OFDM frame buffer 514 and a next OFDM frame buffer 512 that store the current and next OFDM frame for transmission.

Figure 6:
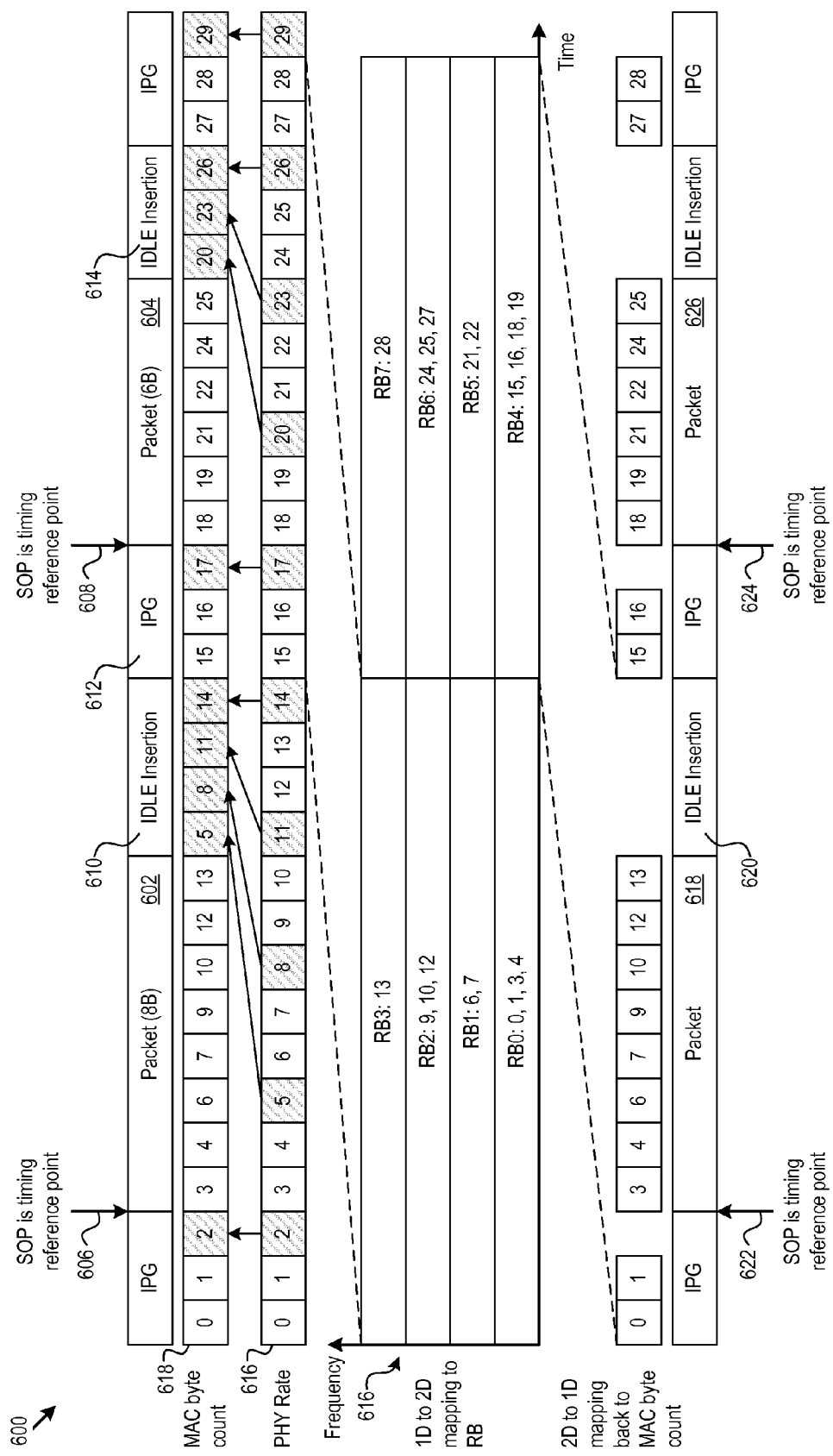
FIG. 6 shows an example of IDLE insertion for rate adaptation between a fixed rate network layer and a variable rate network layer.
Figure 7:
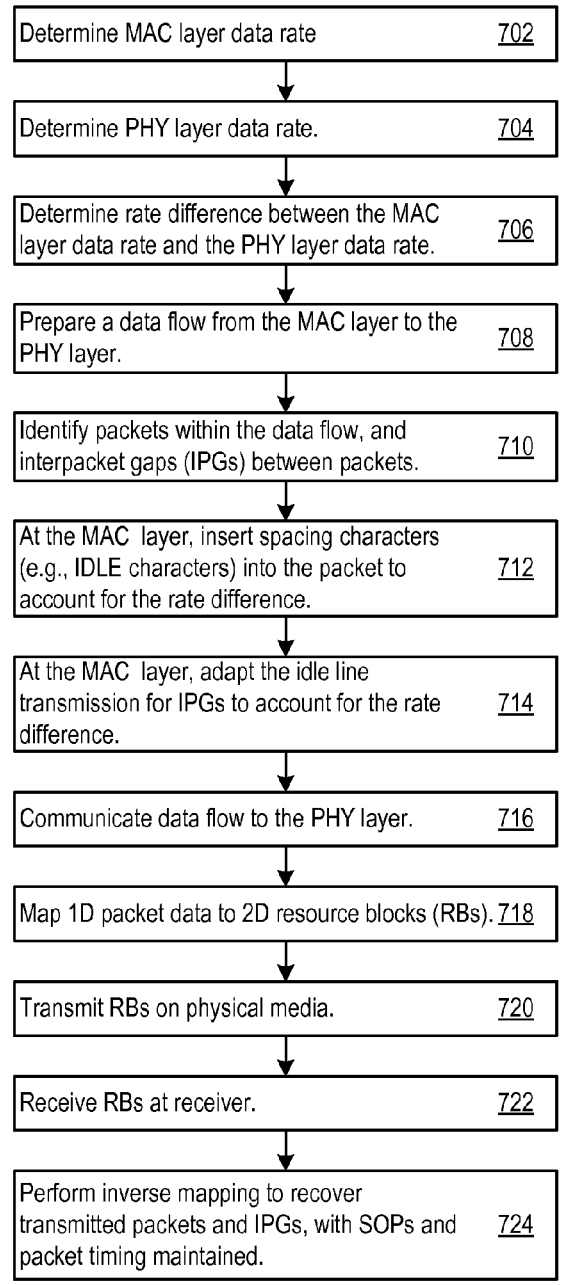
FIG. 7 shows logic that a system may implement to perform IDLE insertion for rate adaptation, while maintaining packet timing.

FIG. 6 shows an example 600 of IDLE insertion for rate adaptation between a fixed rate network layer (e.g., the MAC layer) and a variable rate network layer (e.g., the PHY layer). FIG. 7 is discussed in parallel, and represents logic 700 that a system may implement in hardware or firmware to perform IDLE insertion for rate adaptation, while maintaining packet timing.

For the purposes of explanation, the example 600 shows an 8 Byte packet 602 and a 6 Byte packet 604, but note that packets of any length may be transmitted and received, according to any predefined communication standard, such as IEEE 802.3. FEC is not shown in the example 600, but may be accounted for in the determination of rate difference and for further IDLE insertion as described below.

FIG. 6 assumes that: the MAC layer data rate has been determined (702), that the PHY layer data rate has been determined (704), and that the difference or ratio between the two has therefore been determined (706).

In this example, the PHY rate is subrated with respect to the MAC rate. In particular, FIG. 6 assumes that the PHY rate is (2/3) the MAC rate. Note however that the IDLE insertion techniques are applicable at any other rate ratios or differences.

The MAC layer establishes the timing reference point to be the start of packet (SOP), as examples, the SOP 606 and SOP 608. In some implementations, the first byte of the destination address may be the SOP timing reference point. IDLE characters are inserted into the data flow (e.g., thereby increasing the frame length for specific packets) after the packet starting point and prior to the IPG. In this manner, packet timing is maintained after the one-dimensional to two-dimensional to one-dimensional transmission and reception of the packet, which includes mapping the data flow to two-dimensional RBs on the physical communication medium, and recovery of the data flow by receiving the RBs and applying an inverse of the mapping at a receiver.

The packet 602 follows the SOP 606, and the MAC layer inserts the IDLE characters 610 for rate adaptation. An interpacket gap (IPG) 612 separates the packet 602, including inserted IDLE characters 610, from the next packet 604. As shown in FIG. 6, the MAC layer has also inserted IDLE characters 614 into the packet 604. In other words, the MAC layer has prepared a data flow from the MAC layer to the PHY layer (708), has identified packets and IPGs within the data flow (710) and has inserted spacing characters into the packets to account for the rate difference (712).

Because, in this example, the PHY rate is (2/3) the MAC rate, the PHY needs 12 units of time to transmit data corresponding to 8 units of time referenced to the MAC layer. As a reference, FIG. 6 shows time incrementing in units of bytes along the PHY rate axis 616. As a second reference, FIG. 6 shows byte time along the MAC rate axis 618. FIG. 6 shows that in the reference frame of the MAC layer, the packet 602 is composed of bytes occurring at times: 3, 4, 6, 7, 9, 10, 12, and 13.

The MAC layer has determined the rate difference, and determines that transmitting an 8 byte packet (at the MAC rate) requires 12 units of time at the PHY layer. In response, the MAC layer lengthens the frame in packet 602 by inserting four bytes of IDLE characters 610 into the frame in packet 602 prior to the IPG 612. The IDLE characters 610 act as a type of time buffer over which the PHY layer transmission extends to transmit the 8 bytes of general purpose packet data (data at MAC time 3, 4, 6, 7, 9, 10, 12, and 13) received from the MAC layer. That is, the PHY layer replaces the IDLE characters 610 with data received from the MAC layer. As the data received from the MAC layer is transmitted, the data eventually extends into and replaces the IDLE characters inserted into the frame, so that at the end of the 8th byte on the PHY (the entirety of the general purpose data), 12 bytes of transmission time have been consumed at the MAC layer (the entirety of the general purpose data).

Expressed another way, the PHY layer transmits data for byte times 3 and 4 from the MAC layer over PHY layer byte times 3, 4, and 5 at the PHY layer. Data for byte times 6 and 7 from the MAC layer are transmitted over PHY layer byte times 6, 7, and 8. Data for bytes 9 and 10 from the MAC layer are transmitted over PHY layer byte times 9, 10, and 11 (now extending into inserted IDLE characters 610). Finally data for byte times 12 and 13 are transmitted over PHY layer byte times 12, 13, and 14, all of which occur over the IDLE characters 610. In a sense, the MAC layer eliminated PHY layer byte times 5, 8, 11, and 14, accumulated the eliminated byte times, and transferred the byte time to IDLE characters 610 at the end of the packet 602.

A similar situation applies to packet 604, which is 6 bytes in length. It takes the PHY layer (3/2)*6 = 9 units of time to transmit the 6 bytes of general purpose data from the MAC layer. Accordingly, the MAC layer inserts three bytes of IDLE characters 614 into the frame prior to the IPG that follows the packet 604. As a result, the packet extends over 9 units of byte time at the MAC, but (2/3)*9=6 units of byte time at the PHY. The PHY transmits the six bytes of general purpose packet data 18, 19, 21, 22, 24, and 25 over the 9 units of byte time provided by the IDLE extended packet 604. In this example, it is bytes 20, 23, and 26 in packet time that the MAC layer, in a sense, eliminated and transferred to IDLE characters 614.

Note that similar rate adaptations may be applied to the IPG (714). For instance, the IPG 612 extends over three units of byte time at the MAC layer: 15, 16, and 17. IPGs may be transmitted as a known idle line state. At the PHY layer, the IPG 612 may be transmitted over the three MAC layer byte times by only transmitting the idle line state during PHY layer byte times 15 and 16. There is no need to transmit idle line data corresponding to the MAC layer byte time 17, and FIG. 6 shows that in this example, the PHY layer does not do so.

IEEE 802.3 IDLE characters are just one example of spacing characters that the MAC layer and PHY layer may use for rate adaptation. The layers may use other predefined bit patterns that signify spacing data for the purposes of rate adaptation.

The MAC layer passes the data flow to the PHY layer (716), e.g., over the XGMII interface. FIG. 6 also shows an example mapping 620 of the one-dimensional packet data in the PHY layer onto two-dimensional RBs (718) transmitted on the physical medium (720). On one axis of the RBs are the frequency subcarriers for that RB, and on the other axis are symbols transmitted on the frequency subcarriers. Symbols may encode different numbers of bits, and therefore any particular RB may carry more or fewer bits than a different RB. That is, the bit loading changes from RB to RB.

The example in FIG. 6 shows RB0 carrying data for byte time 0, 1, 3, and 4. RB1 carries data for byte time 6 and 7, while RB2 carries data for byte time 9, 10, and 12. RB3 carries data for byte time 13. The start or end of a RB need not align to the start of end of a packet, and thus, for instance, RB0 carries IPG data prior to the packet 602, as well as the first two byte times (3 and 4) of data for the packet 602. Four additional resource blocks are present in FIG. 6: RB4 carries data for byte times 15, 16, 18, and 20; RB5 carries data for byte times 21 and 22; RB6 carries data for byte times 24, 25, and 27; and RB7 carries data for byte time 28.

At the receiver, the two-dimensional RBs are received (722) converted back to one-dimensional packet data and IPG data. Note that the receiver is also aware of the rate difference between the PHY layer and the MAC layer. As a result, the receiver may therefore perform an inverse mapping to recover the packet data (724).

For instance, FIG. 6 shows that the receiver has recovered the IPG prior to packet 602 using the data from byte time 0 and 1 (data for byte time 2 was not transmitted for the reasons explained above). Given the (2/3) rate ratio between the PHY layer and the MAC layer, the MAC layer expands the data for byte times 0 and 1 over the three bytes times 0, 1, and 2.

With regard to the packet 602, the receiver receives the data from RB0, R131, RB2, and RB3, which was sent in order from the transmitting system. That is, the receiver recovers the data for the 8 byte times 3, 4, 6, 7, 9, 10, 12, and 13 and builds a reconstructed packet 618 (corresponding to packet 602) with that data. Again, the receiver is aware of the rate ratio between the MAC layer and the PHY layer, and recognizes that 8 units of data at the MAC extend over 12 units of data at the PHY layer. As such, the MAC layer in the receiver inserts four IDLE characters 620 into the reconstructed packet 618. The reconstructed packet 618 therefore matches the transmitted packet 602 in length, content, and order of data.

One result of the reconstruction is that the SOP 622 of the reconstructed packet 618 and the SOP 624 of the reconstructed packet 626 are maintained. Because timing is referenced to the SOP, timing is also maintained through the 1D to 2D to 1D mapping that occurs during transmission and reception. That is, the IDLE insertion process adapts the fixed rate MAC layer to the variable rate PHY layer, and does so in a way that beneficially maintains packet timing.

Figure 8:
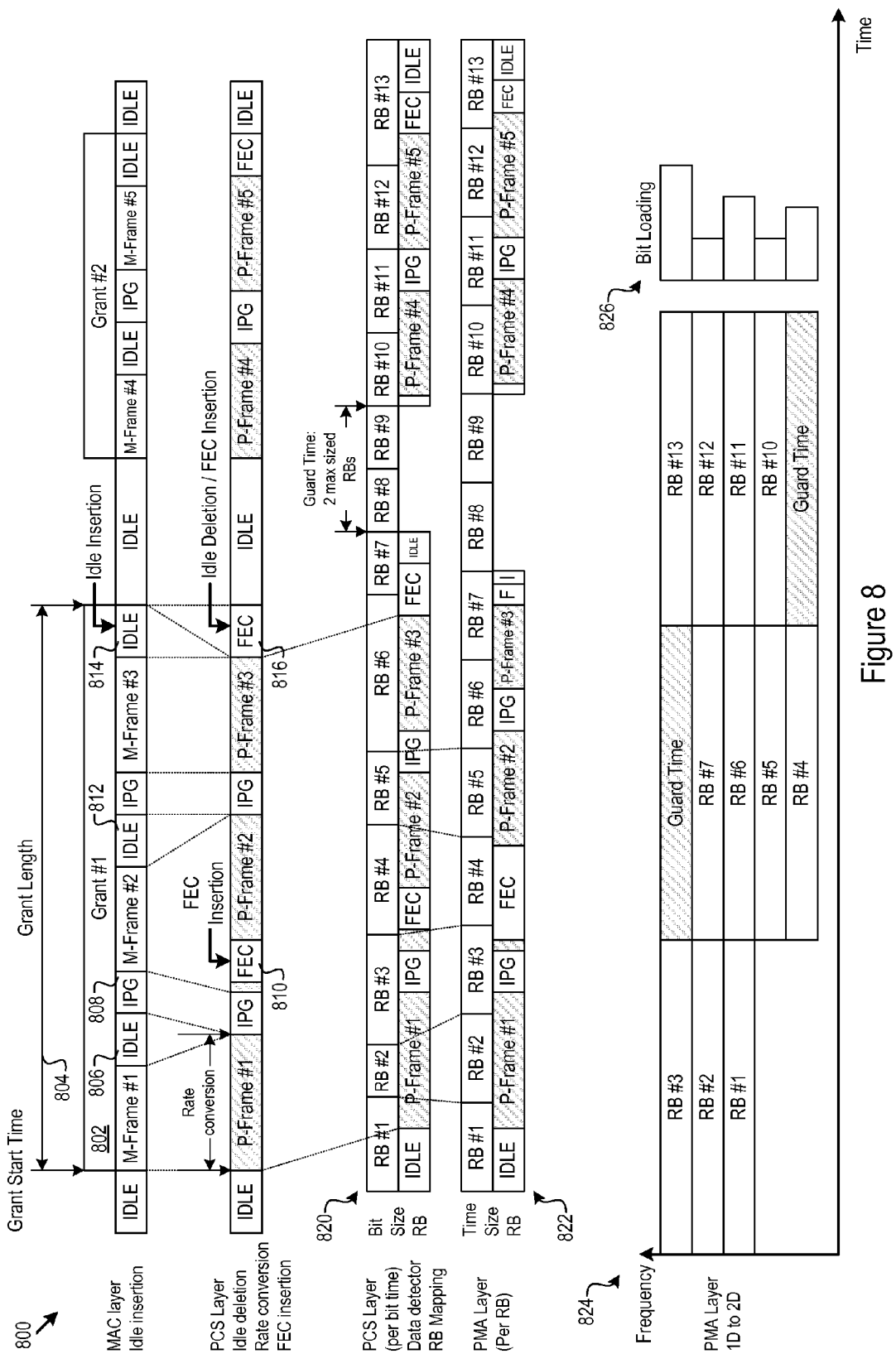
FIG. 8 shows an example of IDLE insertion for rate adaptation while accounting for FEC overhead, between a fixed rate network layer and a variable rate network layer.

FIGS. 8 shows an example of IDLE insertion 800 for rate adaptation while accounting for FEC and other overhead, between a fixed rate network layer and a variable rate network layer. Note that IDLE characters are also covered by FEC. As a result, the MAC layer may insert additional IDLE characters to provide room to accommodate FEC parity added in the PHY layer. For instance, the MAY layer may insert IDLE characters for FEC when the percent of FEC overhead (OH) is greater than a code word, or when FEC is added at the end of a burst.

Figure 9:
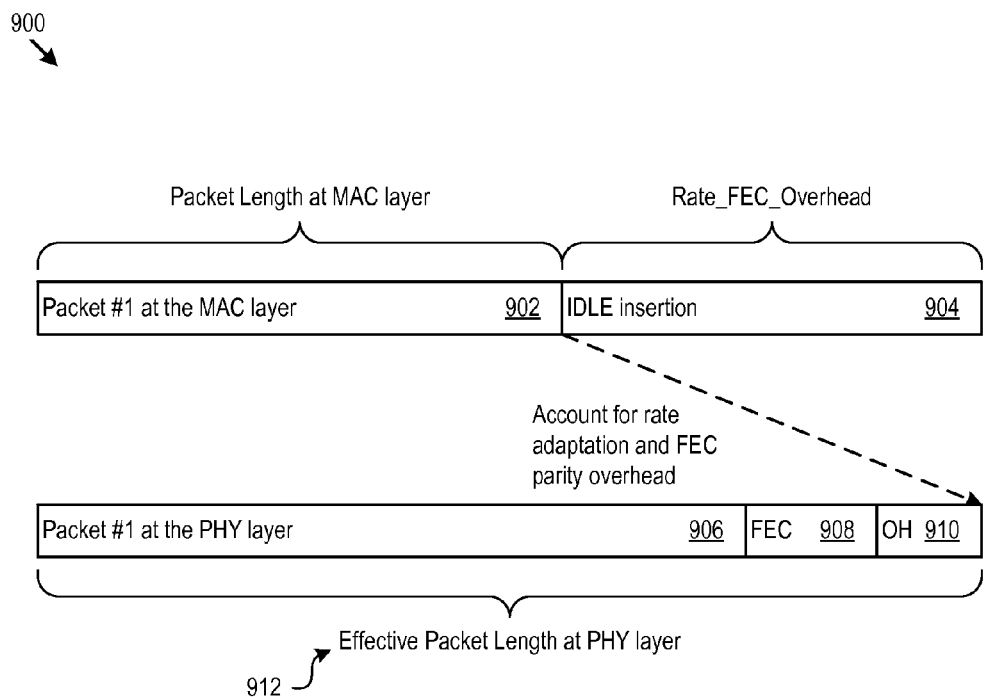
FIG. 9 shows an example of adaptation that includes the effects of FEC.

Turning briefly to FIG. 9, that figure shows an example of adaptation 900 that includes the effects of FEC and OH. FIG. 9 shows a packet 902 at the MAC layer, with IDLE characters 904 to account for both rate adaptation and FEC parity added in the PHY layer as well as additional overhead that may be added. Note that the IDLE characters 904 result in extending the frame 902 at the MAC layer to the effective length 912 needed by the PHY layer to transmit the frame 906. The frame 906 at the PHY layer includes the general purpose frame data, FEC 908, and other overhead 910 (e.g., the overhead associated with issuing a transmission grant).

In one implementation, the system may determine the new length caused by FEC and OH, and therefore determine the additional IDLE characters 904 added for FEC, OH, and rate according to:

(1) Rate_FEC_Overhead(length)=((length+FEC parity+OH)*(MAC rate)/(PHY rate))−length.

In equation (1), 'length' may be the frame length at the MAC layer, 'MAC rate' may be, for instance, a fixed rate, such as 10 Gbps, 'PHY rate' may represent a variable PHY layer data rate, and 'OH' may represent additional overhead, including grant overhead. The PHY layer may insert FEC and OH data anywhere within the frame 1006.

Returning to FIG. 8, the example of IDLE insertion 800 shows how the system maps FEC parity words into a frame to account for the FEC overhead. Note that even IDLE characters will have FEC for the IDLE characters. The MAC layer may insert additional IDLEs to accommodate FEC by adding further IDLE characters at the end of the frame. The PHY layer periodically inserts FEC into the frame, e.g., interleaved with other packet data. The PHY layer may insert the FEC on FEC block boundaries. The PHY layer, however, may also delete the IDLE characters at the end of the frame that the MAC layer inserted to account for the added FEC. That is, the FEC on block boundaries replaces the FEC IDLEs inserted by the MAC layer at the end of the frame. Counters at the transmitter and receiver may track how many and when the FEC IDLEs were inserted so that the inverse function at the receiver may remove the FEC parity packed within the frame and re-insert the FEC IDLE characters at the end of the frame.

At the receiver, the PHY layer may receive the RBs, and decode and unpack the data within the RBs. The PHY layer may then perform error detection and correction with the FEC data, remove the FEC data inserted by the transmitting PHY layer, and reconstruct the frame. Note that reconstruction of the frame is the inverse operation as transmission, and includes re-inserting, at the end of the frame, the IDLE characters added by the transmitting MAC layer. As a result, the receiver obtains the same packet prepared by the transmitting MAC layer by inserting IDLE characters. Because timing is referenced to the SOP, timing is again preserved through the one-dimensional to two-dimensional to one-dimensional transmission process, while accounting for rate adaptation, FEC and other OH. The IDLE insertion techniques adapt the MAC rate to the PHY rate over a frame. The data detector 504 may align the frame to RB boundaries, and the elastic buffer 510 may absorb any variation in bit rates.

FIG. 8 shows a grant 802 extending over a predetermined grant length 804. The MAC layer performs IDLE insertion for accommodate for both rate adaptation and FEC insertion. In the example of FIG. 8, the MAC layer has inserted the IDLE characters 806 for M-Frame #1. At the PHY layer, M-Frame #1 expands due to the slower PHY layer rate, as shown by the P-Frame #1. The IDLE characters 806 are effectively replaced at the PHY layer with the P-Frame #1 data. The IPG 808 delineates the packet with M-Frame #1 from the subsequent packet that carries M-Frame #2.

As noted above, the PHY layer inserts FEC on a regular basis. In the example in FIG. 8, the FEC 810 occurs in the next packet shortly after the start of the P-Frame #2, and the MAC layer has inserted the IDLE characters 812 to accommodate the FEC 810. The PHY layer eliminates the IDLE characters 812 and substitutes in the FEC 810. A similar operation occurs with M-Frame #3, for which the MAC layer has inserted the IDLE characters 814 to make room for FEC, with the PHY layer deleting the IDLE characters 814 and inserting the FEC 816.

FIG. 8 also shows an example of mapping the packet data, IPGs, and guard time to RBs. In the example mapping 820, the RBs change size to reflect the number of bits each one carriers. In the example mapping 822, the RBs are shown a fixed size, e.g., the fixed transmit duration for all RBs. In this example, RB #8 and RB #9 are not transmitted, but used as guard time instead, between the grant 804 and the following grant. The two-dimensional mapping 824 shows how and when each RB is transmitted, and the bit loading 826 illustrates the relative number of bits transmitted by the resource blocks in this example.

Within the grant 804, three frames (in this example) will be transmitted upstream. In preparing the data flow to the PHY layer, the MAC layer inserts IDLE characters to account for the rate different between the MAC layer and the PHY layer, and for FEC. Note that MPCP time is linear—time moves on in a fixed interval according to the fixed MAC layer data rate. In the PHY layer, however, rate conversion is occurring, and therefore the frame length expands, e.g., as FEC is inserted, and due to bits taking longer to transmit on the physical medium in comparison to the MAC layer rate.

Figure 10:
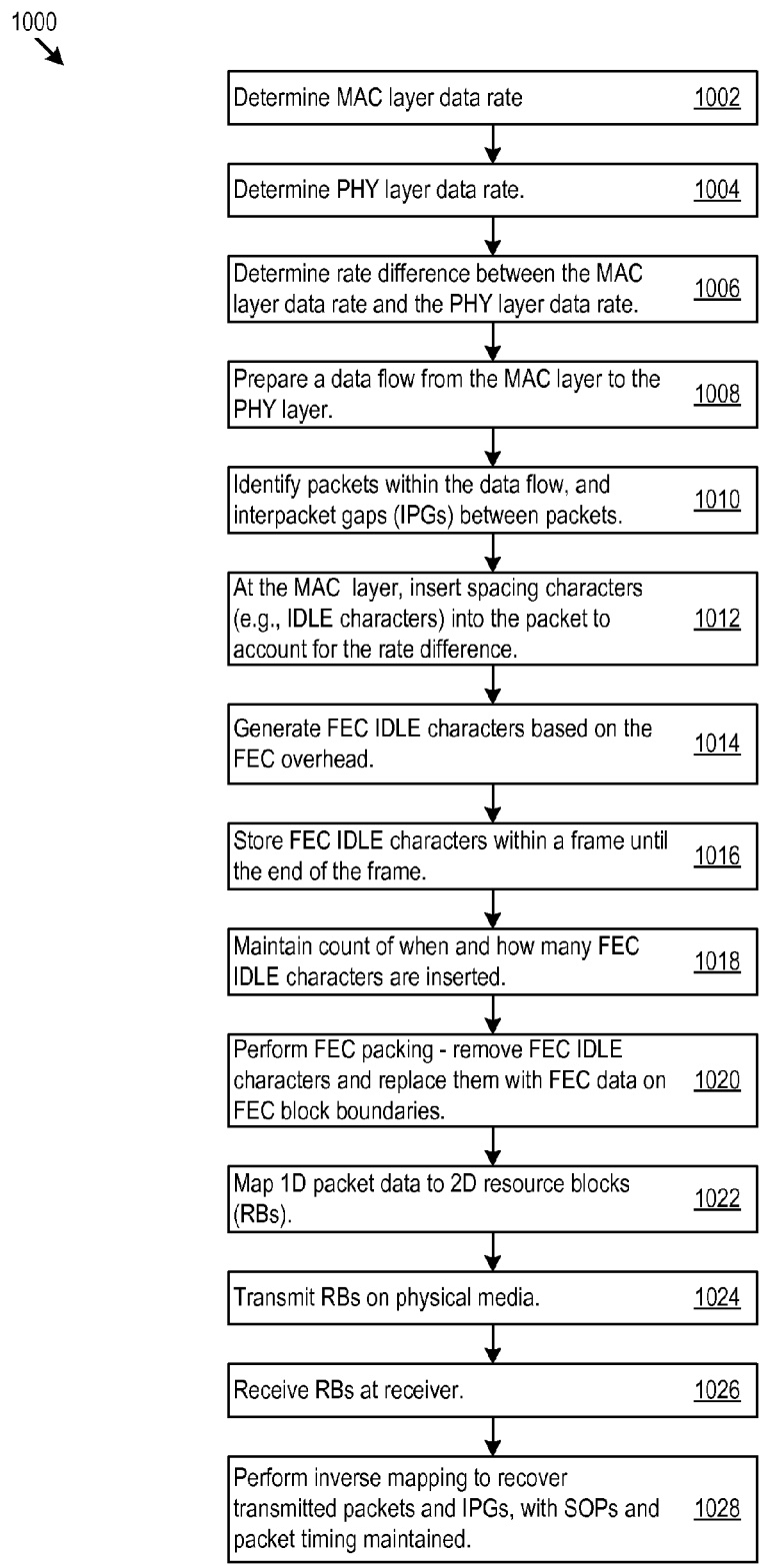
FIG. 10 shows logic that a system may implement to perform IDLE insertion for rate adaptation while accounting for FEC overhead, while maintaining packet timing.
Figure 11:
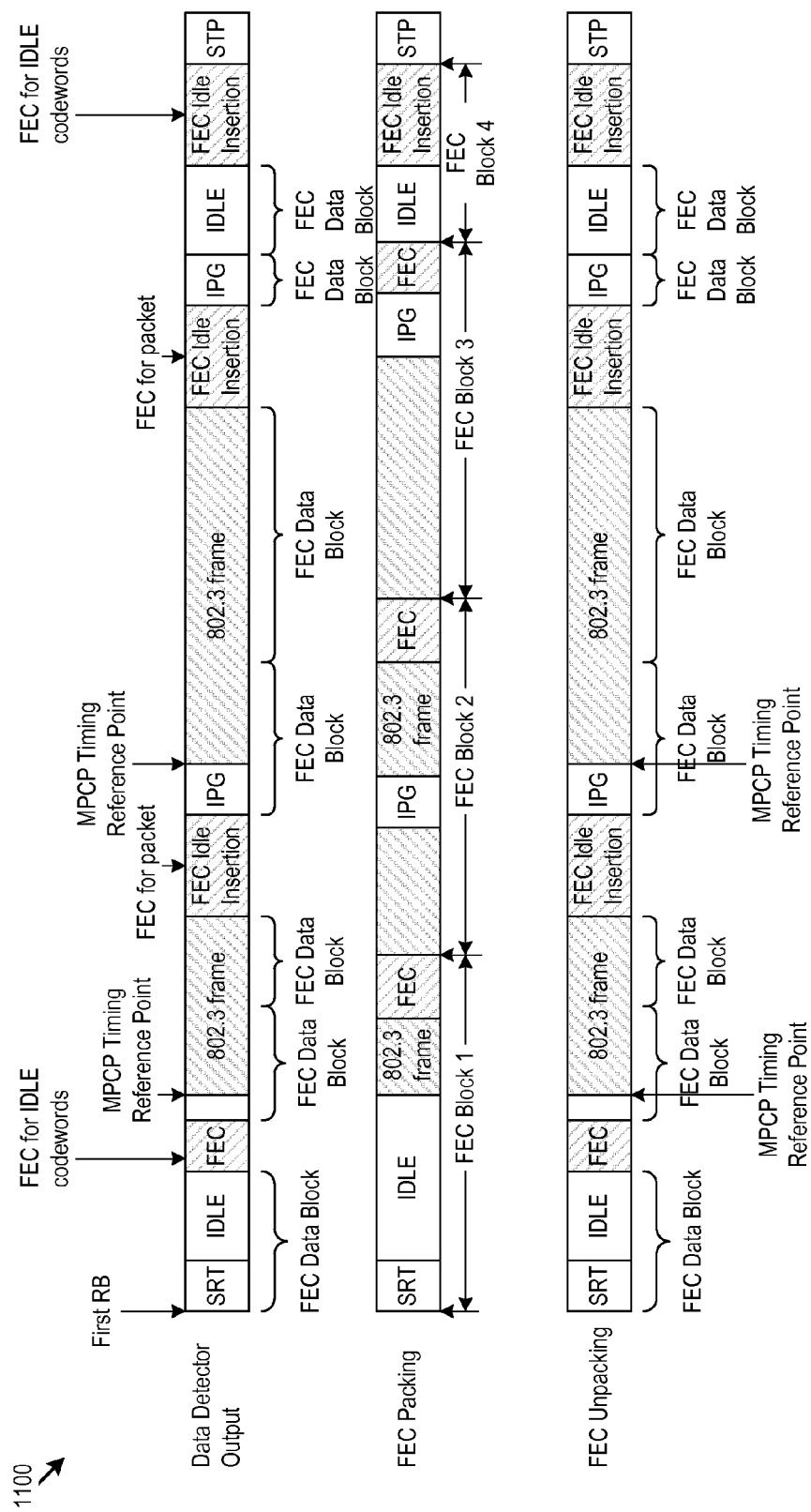
FIG. 11 shows example FEC packing and unpacking.

FIG. 10 shows logic 1000 that a system may implement perform IDLE insertion for rate adaptation while accounting for FEC overhead, and while maintaining packet timing. FIG. 11 provides a companion illustration of an example 1100 of FEC packing and unpacking. The logic 1000 includes determining the MAC layer data rate (1002), determining the PHY layer data rate (1004), and determining the different between the two rates (1006). The logic 1000 also includes preparing a data flow from the MAC layer to the PHY layer (1008), identifying packets within the data flow (1010), and inserting IDLE characters to account for the rate difference (1012).

With regard to FEC overhead, the logic 1000 generates FEC IDLE characters based on the FEC overhead (1014). FEC IDLE characters within a frame may be stored until the end of the frame (1016), and an accumulator may maintain a count of how many, and when, FEC IDLE characters are inserted (1018). The last FEC block may be a shortened block. The logic 1000 may also perform FEC packing, during which FEC IDLE characters are removed and replaced with FEC on FEC block boundaries (1020).

Note that the IDLE insertion techniques pack frame data in a manner that minimizes jitter. The timing reference point is the start of frame. Given the way that IDLE insertion occurs, and the inverse operation upon reception, the start of the frame occurs at the intended location in time, and therefore there is little or no jitter. The timing reference is maintained down the stack at the transmitter and back up at the receiver, with the decoder at the receiver outputting packets that maintain the same structure and timing present in the packets prepared at the transmitting MAC layer.

With regard to FIG. 11, note that FEC is present for IDLE codewords. IDLE characters for FEC are shifted to the end of the frame by the IDLE insertion function. The FEC circuitry inserts FEC periodically, and at the end of the frame, deletes IDLE characters that were inserted to account for the FEC overhead. The regular insertion of FEC results in FEC insertion inside of a frame, in a sense replacing the FEC IDLE characters at the end of the frame as FEC data within the frame.

The FEC packing line in FIG. 11 shows that the FEC circuitry inserts FEC at a fixed interval. The FEC takes the place of the IDLE characters inserted at the MAC layer. After the data detector output, the FEC characters may be stored and accrued until the end of the frame, where they are appended. At the receiver, the opposite mapping occurs, removing the FEC and performing error detection and correction, and appending the frame back together. When the frame is reconstructed, the receiver re-inserts the IDLE characters at the end of the frame, thereby preserving frame time.

For transmission, the logic 1000 maps one-dimensional packet data in the PHY layer onto two-dimensional RBs (1022). The PHY layer transmits the RBs on a physical medium, e.g., a coaxial cable (1024). At the receiver, the two-dimensional RBs are received (1026) and converted back to one-dimensional packet data and IPGs. Note that the receiver is also aware of the rate difference between the PHY layer and the MAC layer, and the FEC and other overhead. As a result, the receiver may therefore perform an inverse insertion of IDLE characters for both rate conversion and accommodation of FEC to recover the packet data (1028).

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A method comprising:
in a communication device comprising a Media Access Control (MAC) layer and a Physical (PHY) layer:
determining a MAC layer data rate of the MAC layer;
determining a PHY layer data rate at which communication will occur over a physical communication medium; and
at the MAC layer:
determining a rate difference between the MAC layer data rate and the PHY layer data rate;
communicating a data flow from the MAC layer to the PHY layer, the data flow comprising data for communication over the physical communication medium, including inserting IDLE characters into the data flow responsive to the rate difference; and
in the PHY layer, replacing, prior to forward error correction encoding, selected IDLE characters among those inserted into the data flow at the MAC layer with data bytes of the data flow received from the MAC layer to adapt to the rate difference between the MAC layer and the PHY layer.

2. The method of claim 1, further comprising:
determining an error correcting overhead incurred in the PHY layer; and
accounting for the error correcting overhead in the rate difference used for inserting the IDLE characters.

3. The method of claim 1, further comprising:
in the PHY layer, replacing selected IDLE characters among those inserted at the MAC layer with data bytes to adapt to the rate difference between the MAC layer and the PHY layer.

4. The method of claim 1, further comprising:
in the PHY layer, replacing other selected IDLE characters among those inserted at the MAC layer with parity bits generated from the forward error correction coding.

5. The method of claim 1, where inserting comprises:
inserting the IDLE characters for the PHY layer to perform rate conversion to account for the rate difference and run the physical communication medium at the PHY layer data rate.

6. The method of claim 1, where:
the MAC layer data rate is a constant rate;
the PHY layer data rate is a subrated rate with respect to the MAC layer data rate; and
where inserting comprises:
inserting the IDLE characters to facilitate adaptation of the constant rate of the MAC layer to the subrated rate of PHY layer.

7. The method of claim 1, where the data flow comprises a packet comprising:
a packet starting point followed by an interpacket gap.

8. The method of claim 7, further comprising:
referencing packet timing to the packet starting point.

9. The method of claim 8, where inserting comprises:
inserting the IDLE characters in the data flow after the packet starting point and prior to the interpacket gap so that packet timing is maintained after:
mapping the data flow to carriers on the physical communication medium and recovery of the data flow by applying an inverse of the mapping at a receiver.

10. The method of claim 9, further comprising:
in the PHY layer, transferring specific bytes of the packet into locations held by specific IDLE characters among those inserted at the MAC layer with data.

11. The method of claim 9, further comprising:
in the PHY layer, replacing selected IDLE characters among those inserted at the MAC layer with data accumulated from the data flow that is temporarily held to accommodate for the rate difference.

12. A system comprising:
control circuitry characterized by a control layer data rate; and
communication medium circuitry comprising:
a communication interface to a communication medium; where:
the communication medium characterized by a transmit data rate at which
the communication interface places data onto the communication medium; at the control circuitry:
determining a rate difference between the control layer data rate and the transmit data rate;
preparing a data flow for the communication medium circuitry; and
responsive to the rate difference, inserting spacing characters in the data flow to the communication medium circuitry, wherein the spacing characters are inserted into the data flow after a start of a packet and before an interpacket gap; and
the communication medium circuitry configured to:
replace selected spacing characters among those inserted into the data flow at the control circuitry with data bytes of the data flow received from the control circuitry to adapt to the rate difference between the control layer data rate and the transmit data rate.

13. The system of claim 12, where the control circuitry is further configured to:
   determine an error coding overhead incurred by the communication medium circuitry; and
   where the rate difference accounts for the error coding overhead, the control layer data rate, and the transmit data rate.

14. The system of claim 12, where:
   the control circuitry comprises a Media Access Control (MAC) layer configured to receive data from an optical communication interface.

15. The system of claim 12, where:
   the communication medium circuitry comprises a Physical (PHY) layer and the communication interface comprises a coaxial cable interface.

16. The system of claim 12, where the communication medium circuitry is configured to:
   replace other selected spacing characters among those inserted by the control circuitry with parity bits generated from forward error correction coding.

17. The system of claim 12, where the data flow includes a packet comprising:
   a packet starting point and where the control circuitry is configured to reference packet timing to the packet starting point.

18. The system of claim 17, where:
   an interpacket gap follows the packet; and where:
   the control circuitry is configured to insert spacing characters in the data flow after the packet starting point and prior to the interpacket gap so that packet timing is maintained after:
      mapping the data flow to frequency sub-carriers on the communication medium and recovery of the data flow by applying an inverse of the mapping at a receiver.

19. A system comprising:
   an optical communication interface;
   a coaxial communication interface;
   control circuitry in communication with the optical communication interface and the coaxial communication interface, the control circuitry comprising:
      a Media Access Control (MAC) layer configured to operate at a fixed MAC layer data rate; and
      a Physical (PHY) layer configured to transmit data through the coaxial communication interface at a PHY layer data rate subrated with respect to the fixed MAC layer data rate; where:
         the MAC layer is configured to:
            determine a rate difference between the fixed MAC layer data rate and the PHY layer data rate;
            communicate a datastream from the MAC layer to the PHY layer, the datastream comprising data bits for communication through the coaxial communication interface; and
            insert, into the datastream, IDLE characters for adapting the PHY layer to the rate difference; and
         the PHY layer is configured to:
            hold data from the datastream received from the MAC layer; and
            replace selected IDLE characters among those inserted at the MAC layer with the data from the datastream that was held in the PHY layer due to the rate difference.

20. The system of claim 19, where:
   the MAC layer is further configured to:
      determine an error coding overhead added by the PHY layer;
      where the rate difference accounts for the error coding overhead, the MAC layer data rate, and the PHY layer data rate;
      insert a packet into the datastream followed by an interpacket gap, the packet comprising a packet starting point to which the MAC layer references packet timing; and
      insert the IDLE characters in the datastream after the packet starting point and prior to the interpacket gap so that packet timing is maintained after:
         mapping the datastream to frequency sub-carriers in the PHY layer and recovering the datastream by applying an inverse of the mapping.

* * * * *